US012587440B2

(12) United States Patent
Viswambharan et al.

(10) Patent No.: US 12,587,440 B2
(45) Date of Patent: Mar. 24, 2026

(54) STATEFUL MANAGEMENT OF NETWORK DEVICE CONFIGURATIONS

(71) Applicant: Cisco Technology, Inc., San Jose, CA (US)

(72) Inventors: Rajesh Indira Viswambharan, Bangalore (IN); Saravanan Radhakrishnan, Bangalore (IN); Derek Scott Ingrouville, Kanata (CA); Marc Faggion, St Leonards (AU); Mark Gertsvolf, Kanata (CA); Prakash Vijayaragavan, Bangalore (IN); Dong Zu, Kanata (CA); Abhijna S, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 42 days.

(21) Appl. No.: 18/798,655

(22) Filed: Aug. 8, 2024

(65) Prior Publication Data

US 2026/0046199 A1 Feb. 12, 2026

(51) Int. Cl.
*H04L 41/0803* (2022.01)
*H04L 41/0213* (2022.01)
(52) U.S. Cl.
CPC ...... *H04L 41/0803* (2013.01); *H04L 41/0213* (2013.01)
(58) Field of Classification Search
CPC .................. H04L 41/0803; H04L 41/0213
See application file for complete search history.

(56) References Cited

U.S. PATENT DOCUMENTS

| | | | |
|---|---|---|---|
| 2016/0350095 A1* | 12/2016 | Ramachandran | ......... G06F 8/65 |
| 2021/0051068 A1* | 2/2021 | Wang | .................. H04L 41/0894 |
| 2021/0111968 A1 | 4/2021 | Clarke et al. | |
| 2022/0239547 A1* | 7/2022 | Wang | .................. H04L 41/0213 |

OTHER PUBLICATIONS

Wallin S., et al., "Automating Network and Service Configuration Using NETCONF and YANG", USENIX Association, Jan. 2011, pp. 1-13.

* cited by examiner

*Primary Examiner* — Suraj M Joshi
(74) *Attorney, Agent, or Firm* — Lee & Hayes, P.C.

(57) ABSTRACT

An example method may include receiving first configuration data associated with a network device, the first configuration data comprising a Yet Another Next Generation (YANG) payload; determining a first subset of the YANG payload that is associated with a first network configuration database; determining a first database transaction, wherein the first database transaction represents one or more database updates to the first network configuration database that is determined based on a first state of the network device and one or more configuration requirements represented by the first subset; discarding the first database transaction; determining second configuration data based on the first database transaction, the second configuration data comprising a command line representation (CLI) of the YANG payload; and providing the second configuration data to a system, the system configured to display the command line representation to a user.

20 Claims, 6 Drawing Sheets

RECEIVE FIRST CONFIGURATION DATA
402

DETERMINE MODULE A
404A

...

DETERMINE MODULE B
404B

...

DETERMINE MODULE K
404K

...

DETERMINE MODULE M
404M

DETERMINE PARTICIPANT A
406A

...

DETERMINE PARTICIPANT N
406N

DETERMINE SECOND CONFIGURATION DATA
408

PROVIDE SECOND CONFIGURATION DATA TO A USER
410

500 ⟍

RECEIVE FIRST CONFIGURATION DATA
502

DETERMINE A DATABASE TRANSACTION
504

DISCARD THE DATABASE TRANSACTION WITHOUT COMMITTING
506

DETERMINE THAT THE DATABASE TRANSACTION DOES NOT VIOLATE ANY CONSTRAINTS
508

PROVIDE SECOND CONFIGURATION DATA TO A USER
510

600

STATEFUL MANAGEMENT OF NETWORK DEVICE CONFIGURATIONS

TECHNICAL FIELD

The present invention relates to the field of computer networking and, more specifically, to techniques for network device configuration management.

BACKGROUND

Network device configuration management is a critical aspect of managing modern computer networks. As networks grow in size and complexity, the need for efficient, accurate, and consistent configuration management becomes increasingly important. Network administrators rely on various tools and protocols to configure and manage network devices, such as switches, routers, and firewalls.

One common approach to network device configuration is the use of data modeling languages, such as YANG (Yet Another Next Generation), to define and represent configuration data. YANG provides a structured and hierarchical format for modeling configuration and state data. However, many network devices and/or network administrators still rely on traditional command-line interfaces (CLIs) for configuration management.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
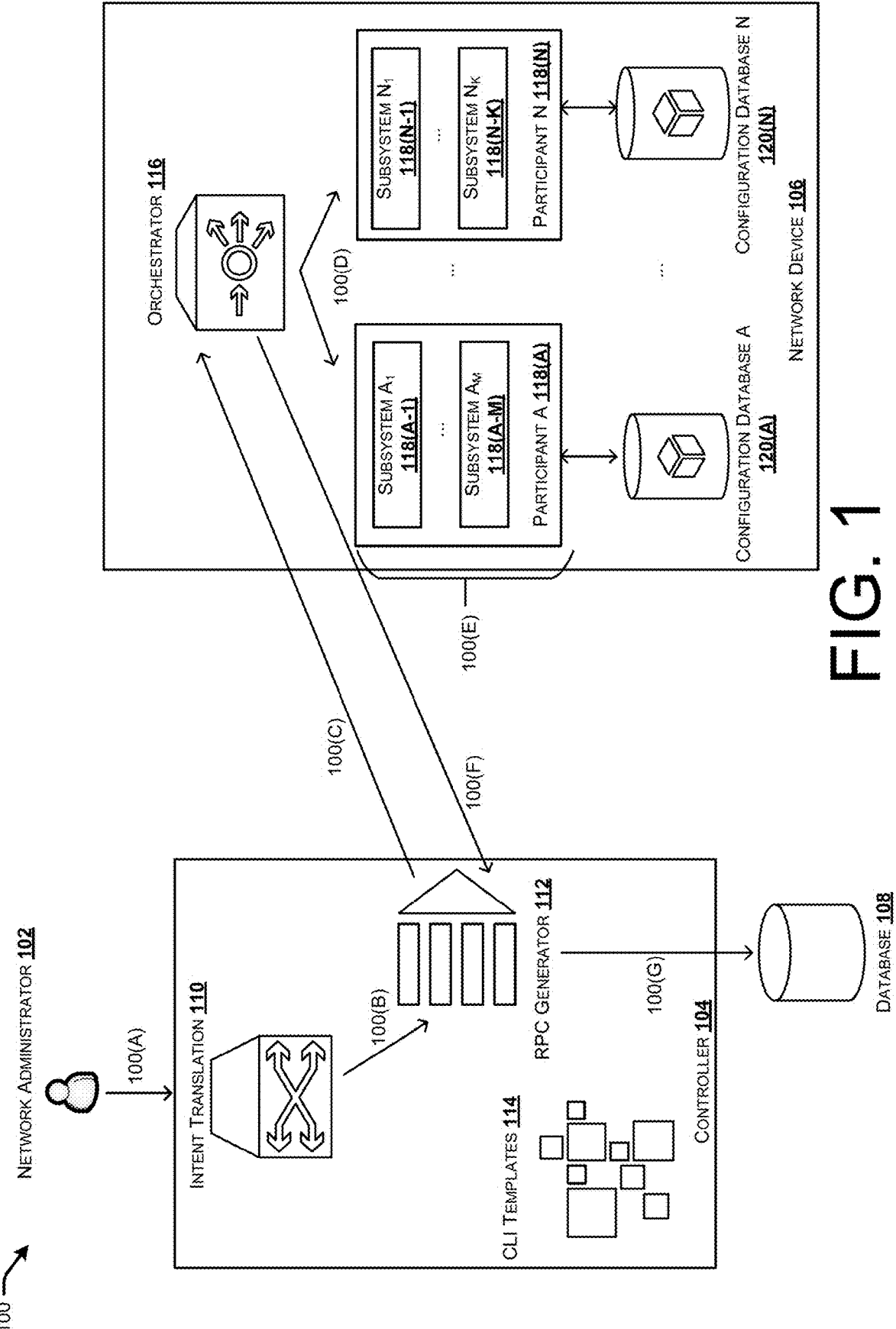
FIG. 1 illustrates an example system for converting a YANG (Yet Another Next Generation) data structure into CLI commands based on the current configuration state of a network device.

This disclosure describes techniques for flexible management of the configuration settings associated with a network device in a computer network. In some implementations, the techniques described herein relate to a method including receiving, by one or more processors, first configuration data associated with a network device, the first configuration data comprising a Yet Another Next Generation (YANG) payload. The method may further include determining, by the one or more processors, a first subset of the YANG payload that is associated with a first network configuration database. The method may further include determining, by the one or more processors, a first database transaction, wherein the first database transaction represents one or more database updates to the first network configuration database that is determined based on a first state of the network device and one or more configuration requirements represented by the first subset. The method may further include discarding, by the one or more processors, the first database transaction. The method may further include determining, by the one or more processors, second configuration data based on the first database transaction, the second configuration data comprising a command line representation of the YANG payload. The method may further include providing, by the one or more processors, the second configuration data to a system, the system configured to display the command line representation to a user.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for flexible management of the configuration settings associated with a network device in a computer network. In some implementations, the techniques described herein enable converting a configuration update request associated with a network device from a data model representation (e.g., a Yet Another Next Generation (YANG) data structure) into a command line interface (CLI) representation. In some implementations, an example system is configured to: (i) receive a configuration update request representing one or more requested updates to the configurations of a network device, (ii) determine a data model representation (e.g., a YANG representation) of the requested configuration updates, (iii) convert the data model representation to a set of CLI commands, and (iv) display the CLI commands to a user (e.g., a network administrator). Displaying the CLI commands may enable the user to confirm that the requested configuration updates align with the user intent before committing the updates to the network device. An example of a data model representation is the YANG data structure including one or more YANG modules. However, while various implementations of the techniques disclosed herein are described with reference to converting a YANG data structure into CLI commands, a person of ordinary skill in the relevant technology will recognize that the techniques described herein may be extended to any data model representation of network device configurations.

In some implementations, the techniques described herein relate to converting a YANG data structure (e.g., or other data model representation) associated with a network device configuration (e.g., a requested network device configuration update) into CLI commands. The YANG data structure converted to CLI commands may, for example, be the YANG payload of a network configuration protocol request, such as a Network Configuration Protocol(NETCONF) request and/or a Representational State Transfer Configuration Protocol (RESTCONF) request. In some implementations, the system receives the YANG data structure using a remote call procedure (RPC) request, such as a NETCONF RPC request.

The system may perform the conversion of a YANG data structure into CLI commands in a stateful manner that is dependent on the configuration state of the target network device. In some implementations, the CLI representation of a YANG data structure may be different depending on the current configuration state of the target network device. For example, the CLI representation of a YANG data structure that sets a switchport mode of a switch interface may be different depending on whether the current configuration of the switch interface currently associates the switch interface with an existing switchport mode or whether the switch interface is currently unassigned to any switchport modes. This may be because: (i) if the switch interface is not currently assigned to a switchport mode, the CLI command may directly set the specified switchport mode for the switch interface, while (ii) if the switch interface is currently assigned to a switchport mode, the CLI command may first need to remove the existing switchport mode and then set the new switchport mode for the switch interface. As another example, the CLI representation of a YANG data structure that sets the Internet Protocol (IP) address of a device interface may be different depending on whether the interface currently has an assigned IP address or not. This may be because: (i) if the interface is not currently assigned to an IP address, the CLI command may directly set the specified IP address for the switch interface, while (ii) if the switch interface is currently assigned to an IP address, the CLI command may first need to remove the existing IP address and then set the new IP address for the switch interface.

As these examples illustrate, a static and non-stateful conversion of a YANG data structure to a CLI representation may fail to generate an accurate CLI representation. When such an inaccurate CLI representation is provided to a user (e.g., a network administrator), the inaccuracies associated with the CLI representation may hide potential issues and/or conflicts from the user and undermine the effectiveness of the confirmatory CLI preview process. For example, a user may mistakenly request to set an IP address for the interface GigabitEthernet1/0/1, which is already associated with an IP address, even though the user really intended to set an IP address for the interface GigabitEthernet1/0/2, which is not currently associated with an IP address. In this example, a non-stateful and static conversion of a YANG module may result in a CLI preview that does not indicate to the user that the requested configuration change would overwrite the existing configuration of a network switch. In contrast, a stateful conversion may result in a CLI preview that indicates such an attempted overwrite to the user, which may cause the user to detect the mistake in the configuration change request. Accordingly, in some implementations, by generating more accurate CLI previews for requested network configurations, the techniques described herein increase the likelihood that inadvertent overwrite of network device configurations are detected and prevented by network administrators, which may increase the reliability and security of computer networks.

In addition to potentially generating inaccurate CLI representations, static and non-stateful YANG-to-CLI conversion may require complex rules for conversion of various YANG namespaces into corresponding CLI commands. Such rules may need to be updated as the complexity of YANG modules, CLI syntaxes, and network device configurations evolve over time. For example, as new namespaces are added and/or existing namespaces updated, the conversion rules may need to be updated to accommodate new elements and/or structures defined within those namespaces.

Accordingly, in some implementations, stateful YANG-to-CLI conversion is more accurate, more scalable, and/or less resource-intensive.

In some implementations, a system is configured to perform stateful conversion of a YANG data structure into CLI commands by assigning the modules in the YANG data structure to different conversion participants (e.g., conversion subsystems, preview participants, and/or the like). A conversion participant may be a software component responsible for converting a specific portion of the YANG data structure into corresponding CLI commands based on the current configuration state of the target network device. For example, a conversion participant may be configured to: (i) determine a database transaction against a configuration database (e.g., configuration data store) based on the configurations represented by one or more YANG modules assigned to the conversion participant, and (ii) determine a set of CLI commands based on the database transaction without committing the transaction to the configuration database (e.g., without executing the database transaction and/or with executing the database transaction in in an isolated environment). A conversion participant may be a process, a thread, a collection of one or more microservices, a subsystem of the network device, a software component executing on one or more dedicated devices, and/or the like.

In some implementations, a conversion participant is associated with one or more YANG modules and responsible for determining the CLI command(s) corresponding to those YANG modules. For example, in some implementations, a conversion participant may be associated with a set of YANG modules that are related to a common participant of a network device (e.g., to a common interface). As another example, in some implementations, a conversion participant may be associated with a set of YANG modules whose relevant features are stored on a common configuration store (e.g., configuration database). As another example, in some implementations, a conversion participant may be associated with a single YANG module. In some implementations, a set of conversion participants may register themselves with an orchestrator component (e.g., during a network device's boot-up process). During this registration process, a conversion participant may indicate to the orchestrator which YANG modules the conversion participant is responsible for and/or may be assigned to a set of YANG modules by the orchestrator. Accordingly, in some implementations, when the orchestrator in receives a YANG data structure, the orchestrator can assign the modules of the YANG data structure based on the assignment of modules to conversion participants.

In some implementations, a conversion participant may be associated with a specific database (e.g., a configuration database) that stores the current configuration state of the network device components associated with the YANG modules assigned to the conversion participant. For example, in some implementations, when multiple YANG modules execute updates against a common database, the YANG modules may be collectively assigned to a common conversion participant. When the system receives a YANG data structure representing a requested configuration update, the system may identify the YANG modules included in the data structure and assign each module to the appropriate conversion participant based on the database associated with the module. Each conversion participant may then determine a database transaction against its associated database based on the configurations represented by its assigned YANG modules. The database transaction may represent the changes that would need to be made to the database to apply the requested configuration updates. However, instead of directly executing the database transaction and committing the changes to the database, the conversion participant may determine the corresponding CLI commands based on the database transaction without committing the transaction. This may involve analyzing the database transaction to identify the specific configuration changes represented by the transaction and generating the appropriate CLI commands to implement those changes on the network device. By determining the CLI commands based on the database transaction without committing the transaction, the conversion participant may perform a stateful conversion of the YANG modules to CLI commands without modifying the actual configuration state of the network device.

For example, the system may receive a YANG data structure that includes a first YANG module that sets configurations for a network interface and a second YANG module that sets configurations for a routing protocol associated with the network interface. In this example, both the first and second YANG modules may execute updates against a common configuration database that stores the current configuration state of the network device. Accordingly, the system may assign both the first and second YANG modules to a common conversion participant associated with the configuration database. The conversion participant may then determine a database transaction against the configuration database based on the configurations represented by the first and second YANG modules. For example, the database transaction may include a first set of operations for updating the configuration database to reflect the network interface configurations specified by the first YANG module and a second set of operations for updating the configuration database to reflect the routing protocol configurations specified by the second YANG module.

As another example, the system may receive a YANG data structure that includes a first YANG module that sets configurations for a network interface and a second YANG module that sets configurations for a security policy. In this example, the first YANG module may execute updates against a configuration database that stores the current configuration state of the network interfaces, while the second YANG module may execute updates against a separate security policy database that stores the current security policies for the network device. Accordingly, the system may assign the first YANG module to a conversion participant associated with the configuration database and the second YANG module to a different conversion participant associated with the security policy database. Each conversion participant may then determine a database transaction against its respective database based on the configurations represented by its assigned YANG module. For example, the first conversion participant may determine a transaction that includes operations for updating the configuration database to reflect the network interface configurations specified by the first YANG module, while the second conversion participant may determine a transaction that includes operations for updating the security policy database to reflect the security policy configurations specified by the second YANG module.

As yet another example, the system may receive a YANG data structure that includes four YANG modules: a first YANG module that sets configurations for a network interface, a second YANG module that sets configurations for a routing protocol associated with the network interface, a third YANG module that sets configurations for a quality of service (QOS) policy, and a fourth YANG module that sets configurations for an access control list(ACL). In this example, the first and second YANG modules may execute updates against a common configuration database that stores the current configuration state of the network interfaces and routing protocols, while the third and fourth YANG modules may execute updates against a separate policy database that stores the current QoS and ACL policies for the network device. Accordingly, the system may assign the first and second YANG modules to a conversion participant associated with the configuration database and the third and fourth YANG modules to a different conversion participant associated with the policy database. The first conversion participant may then determine a database transaction against the configuration database based on the configurations represented by the first and second YANG modules, which may include operations for updating the configuration database to reflect the network interface and routing protocol configurations specified by these modules. Similarly, the second conversion participant may determine a database transaction against the policy database based on the configurations represented by the third and fourth YANG modules, which may include operations for updating the policy database to reflect the QoS and ACL configurations specified by these modules.

Accordingly, in some implementations, the systems described herein include determining modules of a YANG data structure and assigning those modules to conversion participants, for example by grouping modules that affect the same database. However, while various implementations of the techniques disclosed herein describe assigning YANG modules and/or groups of YANG modules to conversion participants, a person of ordinary skill in the relevant technology will recognize that other (e.g., more granular) segments of a YANG data structure and/or another data model representation may be assigned to conversion participants. For example, a YANG module may include a container that includes configurations associated with an individual network component (e.g., an individual interface). In some implementations, the system may assign containers and/or groups of containers to conversion participants. As another example, a non-YANG data model representation may include a top-level hierarchical segment. The system may assign top-level hierarchical segments and/or groups of top-level hierarchical segments to conversion participants.

As described above, in some implementations, the techniques described herein may be performed by an orchestrator component. The orchestrator component may be configured to: (i) receive a YANG data structure (e.g., as the payload of a network configuration input, such as an RPC input), (ii) assign modules of the YANG data structure to conversion participants, (iii) receive CLI commands generated by each participant (e.g., generated by determining a database transaction based on the assigned modules and determining CLI commands corresponding to the database transaction), and (iv) combine the CLI commands to generate a CLI representation. In some implementations, the orchestrator component is executed on the network device. In some implementations, the orchestrator component is executed on the network controller. In some implementations, the orchestrator component is executed on a third device other than the network device and the network controller.

In some implementations, the different operations associated with the orchestrator are distributed across two or more devices (e.g., two or more of the network device, the network controller, or a third device other than the network device and the network controller). For example, a first device may execute orchestrator operations associated with determining YANG subsets (e.g., modules or groups of modules) and/or assigning such subsets to conversion participants (e.g., database-specific conversion participants), while a second device may execute orchestrator operations associated with determining the database transactions for YANG subsets, discarding the database transactions, and/or determining CLI command subsets based on the database transactions. The second device may, for example, execute operations associated with the conversion participants.

In some implementations, the orchestrator component is executed on a different device than the device used to execute the operations associated with the conversion participants. For example, the orchestrator component may be executed on one or more devices other than the network device (e.g., one or more of the network controller or a third device other than the network device and the network controller), while the conversion participants are executed on the network device.

As further described above, in some implementations, the system (e.g., the orchestrator component described above) may receive the YANG data structure using an RPC input. For example, the RPC input may be an RPC input defined by NETCONF, and the YANG data structure may be the payload of that RPC input. In some implementations, the system may provide the CLI commands resulting from the YANG-to-CLI conversion using an RPC reply, such as an RPC reply that provides the CLI commands as a string within an Extensible Markup Language (XML) field and/or a JavaScript Object Notation (JSON) field.

As further described above, in some implementations, the system causes a conversion participant to determine, based on the YANG module(s) assigned to the participant, a database transaction (e.g., a "dummy" transaction) that is not committed and/or is discarded. For example, the system may cause the conversion participant to create a temporary database snapshot and/or a separate database instance for executing the transaction. The conversion participant may then execute the transaction against the temporary snapshot and/or separate instance without modifying the production configuration database. This allows the conversion participant to determine the CLI commands based on the transaction without risking any unintended changes to the device configuration. After executing the database transaction against the temporary snapshot and/or separate instance, the participant may discard the transaction.

As another example, a conversion participant may cause the conversion participant to use database transaction management features, such as transaction rollback and/or transaction save-points, to execute the transaction in a way that allows the transaction to be discarded without being committed to the database. For example, the conversion participant may start a new database transaction, execute the transaction within the context of the new transaction, determine the CLI commands based on the executed transaction, and then roll back the new transaction without committing it to the database. The participant may then discard the transaction.

By using the above-described techniques for determining CLI commands based on "dummy" transactions that are not committed to the database, the conversion participants may perform stateful YANG-to-CLI conversion in a safe and isolated manner, without modifying the actual configuration state of the network device. This may enable the system to generate accurate CLI representations of the requested configuration updates based on the current device state, while minimizing the risk of unintended configuration changes and ensuring the stability and reliability of the network device.

Furthermore, by executing the "dummy" transactions in isolated environments, the system may enable multiple conversion participants to perform their respective conversions in parallel. This may improve the efficiency and scalability of the YANG-to-CLI conversion process, particularly in scenarios where the system needs to process large and/or complex YANG data structures involving multiple modules and/or databases.

In some implementations, the techniques described herein include determining whether the requested application of a CLI template is in conflict with existing configurations of a network device (e.g., with network device configurations previously provisioned by a network controller). A CLI template may represent a collection of CLI commands that are configured to enable a user to request a set of configuration updates. A network management application may enable users to create and use CLI templates to request configuration updates that are not natively supported by the network controller. However, the configuration update requests associated with a CLI template may be in conflict with (e.g., may overlap with and/or contradict) controller-provisioned configurations. In some cases, a proposed system determines whether a received YANG payload violates an existing configuration of a network and/or network device. In some cases, if the system determines that the YANG payload violates such an existing configuration, the proposed system determines that the YANG payload is anomalous (e.g., reports the YANG payload as anomalous).

In some implementations, at a first time, a network controller may (e.g., in response to a user request) provisions the configurations of a network device using a network configuration protocol input (e.g., using a NETCONF and/or RESTCONF input). At a subsequent time, the system may receive a request to apply a CLI template that conflicts with the provisioned configurations. If the CLI template was applied without checking for conflicts with the provisioned configurations, the CLI template may inadvertently overwrite the provisioned configurations and cause unexpected system behavior and/or connectivity issues. For example, a network controller may set (e.g., using a NETCONF request with one or more YANG modules) the configuration of a switch interface to set the interface as a trunk port and assign it to virtual local area network (VLAN) 100, while the requested application of a CLI template may attempt to set the same switch interface as an access port and assign it to VLAN 200. In this example, if the CLI template was applied without checking for conflicts, the CLI template's application may overwrite controller-provisioned configurations by changing the switch interface from a trunk port to an access port and by reassigning the switch interface to a new VLN. This requested change may lead to unexpected network behavior and/or connectivity issues.

In some implementations, to determine a conflict between a CLI template and a network device configuration, the system: (i) determines a data model representation (e.g., a YANG representation) of the configuration updates associated with the CLI template, (ii) converts the data model representation into CLI commands (e.g., using the techniques described above for stateful conversion of data model representation(s) of network device configuration(s) into corresponding CLI commands), and (iii) determines whether the CLI commands overwrite the existing network device configuration. For example, the system may: (i) receive a request to apply a CLI template, (ii) determine a data model representation (e.g., a YANG representation) of the configuration updates associated with the requested CLI template, (iii) determine one or more database transactions corresponding to the configuration updates without committing those transactions (e.g., without executing those transactions and/or while executing those instructions in an isolated environment), (iv) determine CLI commands corresponding to the data model representation based on the unexecuted transactions, and (v) determine whether the CLI commands overwrite any existing network device configurations. In some implementations, if the system determines that a requested CLI template overwrites an existing network device configuration, the system may: (i) block the application of the CLI template, (ii) warn the user about this conflict, and/or (iii) tag the CLI template for review.

For example, a network controller may configure a switch interface with the description "Uplink to Core Switch," switchport mode of trunk, assigned VLANs with identifiers 100 and 200, and enabled Spanning Tree Protocol (STP) Bridge Protocol Data Unit (BPDU) Guard. In this example, if a requested CLI template attempts to configure a switch interface with the description "Uplink to Access Switch," switchport mode of access, assigned VLAN 300, and disabled SPT BDPU Guard, the system may convert the CLI template into a YANG data structure and then convert the YANG data structure into CLI commands in a stateful manner to determine the following CLI commands:

interface GigabitEthernet1/0/1
        description "Uplink to Access Switch"
        no switchport mode trunk
        switchport mode access
        no switchport trunk allowed vlan 100,200
        switchport access vlan 300
        no spanning-tree bpduguard enable Based on these CLI commands, the system may determine that the requested CLI template attempts to overwrite the existing description, switchport mode, assigned VLANs, and SPT BPDU Guard settings for the switch interface. Based on this determination, the system may: (i) block the requested application of the CLI template, (ii) warn the user about the detected conflict, and/or (iii) flag the CLI template for review.

In some implementations, to determine a conflict between a CLI template and an existing network device configuration, the system: (i) determines a data model representation (e.g., a YANG representation) of the network device configuration, (ii) converts the data model representation into CLI commands (e.g., using the techniques described above for stateful conversion of data model representation(s) of network device configuration(s) into corresponding CLI commands), and (iii) determines whether the CLI commands determined based on the data model representation are in conflict with the CLI template. In some implementations, the system may: (i) generate a CLI preview of the changes that would be applied by the CLI template, (ii) compare the generated CLI preview with the current running configuration of the network device, which includes the configurations provisioned by the network controller, (iii) identify any conflicts between the CLI template and the controller-provisioned configurations, and (iv) generate a warning or error message if conflicts are detected. In some implementations, to generate a CLI preview of the requested changes associated with a CLI template, the system may: (i) determine a data model representation (e.g., a YANG representation) of the configuration updates requested by the CLI template, (ii) convert the data model representation into a set of CLI commands (e.g., using the techniques described above for stateful conversion of data model representation(s) of network device configuration(s) into corresponding CLI commands), (iii) determine controller-provisioned configurations of the network device, (iv) determine whether the CLI command(s) are in conflict with the controller-provisioned configurations, and (iv) generate a CLI preview representing the specific configuration changes that would be applied by the CLI template and highlighting any conflicts between those changes and the controller-provisioned configurations.

The techniques described herein offer several technical advantages. For example, in some implementations, the techniques described herein improve the security, integrity, and/or reliability of network device configuration management. As described above, in some implementations, by generating more accurate CLI previews for requested network configurations, the techniques described herein increase the likelihood that inadvertent overwrite of network device configurations are detected and prevented by network administrators, which may increase the security, integrity, and/or reliability of computer networks. Additionally, in some implementations, the techniques described herein enable blocking execution of CLI templates that conflict with existing device configurations, which further improves the security, integrity, and/or reliability of network device configuration management by preventing undesirable configuration overwrites.

As another example, in some implementations, the techniques described herein increase the computational efficiency and/or speed of YANG-to-CLI conversion. As described above, determining the CLI preview for a YANG data structure using multiple participants enables executing the operations of those participants in parallel. This may increase the efficiency and/or speed associated with YANG-to-CLI conversion.

FIG. 1 illustrates an example system 100 for converting a YANG data structure into CLI commands based on the current configuration state of a network device 106. As depicted in FIG. 1, the system 100 includes a network controller 104 with an intent translation component 110, an RPC generator component 112, and a data store storing a set of CLI templates 114, as well as and a network device 106 including an orchestrator component 116, N conversion participants such as participant A 118(A) and participant N 118(N), and N configuration databases including configuration database A 120(A) and configuration database N 120 (N). However, while the example implementation provided in FIG. 1 depicts the orchestrator component 116 and the conversion participants as being executed on the network device 106, a person of ordinary skill in the relevant technology will recognize that at least one of the orchestrator component 116 or the conversion participants may at least partially be executed on another device (e.g., on the network controller 104 and/or on a network device other than the network controller 104 and the network device 106).

As further depicted in FIG. 1, at operation 100(A), a network administrator 102 provides a network configuration update request to the network controller 104. The network administrator 102 may be a human user responsible for managing the configuration of the network device 106. The network controller 104 may be a network management platform, such as Cisco DNA Center, which provides a centralized point of control for managing network devices and services. Cisco DNA Center offers a range of features, including device discovery, inventory management, configuration management, and network assurance.

At operation 100(B), the intent translation component 110 of the network controller 104 determines a set of requested network device configuration updates based on the request provided by the network administrator 102. The intent translation component 110 may thus determine the user intent by determining an intent of the network administrator 102 by determining which network device configuration updates the network administrator 102 intended to request. To map the network configuration update request provided by the network administrator 102 to a set of requested network device configuration updates, the intent translation component 110 may use one or more natural language processing techniques, machine learning techniques, and/or rule-based parsing. In some implementations, the intent translation component 110 may receive the configuration update request via one or more forms and determine the administrator intent based on applying a set of rules to the form entries provided by the network administrator 102.

At operation 100(C), the RPC generator component 112 of the network controller 104 generates and transmits an RPC input. The RPC generator component 112 may generate the RPC input based on the set of requested network device configuration updates determined by the intent translation component 110. The RPC input may include a YANG data structure representing the requested configuration updates in a structured format. For example, the RPC input may be an RPC input defined by NETCONF. In some implementations, the RPC generator component 112 generates a YANG data structure based on the set of requested network device configuration updates determined by the intent translation component 110, and then provides the generated YANG data structure as the payload of the RPC input.

After generating the RPC input, the RPC generator component 112 transmit the RPC input containing the YANG data structure to the orchestrator component 116. While the example implementation provided in FIG. 1 depicts the orchestrator component 116 as being executed on the network device 106, a person of ordinary skill in the relevant technology will recognize that the orchestrator component 116 may at least partially be executed on another device (e.g., on the network controller 104 and/or on a network device other than the network controller 104 and the network device 106).

At operation 100(D), the orchestrator component 116 assigns the YANG payloads in the RPC input to a set of N conversion participants. For example, as depicted in FIG. 1, the orchestrator component 116 assigns the YANG payloads in the RPC input to a set of N conversion participants including the participant A 118(A) and the participant N 118(N). A conversion participant may be a subsystem of the network device 106 and/or another device that is configured to determine a database transaction corresponding to a set of conversion subsystems assigned to the participant. In some implementations, to assign the YANG payloads in the RPC input to a set of N conversion participants, the orchestrator component 116: (i) assigns each YANG module to a conversion subsystem and (ii) combines those conversion subsystems that affect the same database into a shared participant.

Accordingly, in FIG. 1, the orchestrator component 116 has assigned a first YANG module to subsystem $A_1$ 118(A–1), a second YANG module to subsystem A 118(A–M), a third YANG module to subsystem $N_1$ 118(N–1), and a fourth YANG module to subsystem NK 118(N–K). Additionally, the orchestrator component 116 has grouped a set of M conversion subsystems including the subsystem $A_1$ 118(A–1) and subsystem A 118(A–M) to participant A 118(A), because the first and the second modules are associated with the configuration database A 120(A). Furthermore, the orchestrator component 116 has grouped a set of K conversion subsystems including the subsystem $N_1$ 118(N–1) and subsystem NK 118(N–K) to participant B 118(B), because the third and the fourth modules are associated with the configuration database B 120(B).

For example, where subsystem $A_1$ 118(A–1) and subsystem $A_2$ 118(A–2) may both be associated with configuration database A 120(A). Subsystem A: 118(A–1) may be assigned YANG modules related to interface settings, while subsystem $A_2$ 118(A–2) may be assigned YANG modules related to VLAN configurations. In some implementations, since both subsystems modify the same configuration database (e.g., an interface configuration database), they may be grouped together and assigned to a single conversion participant, such as conversion participant A 118(A). In this case, conversion participant A 118(A) may determine a single database transaction that includes operations for updating both the interface configuration tables and the VLAN configuration tables in configuration database A 120(A) based on the YANG modules assigned to subsystems A1 118(A–1) and $A_2$ 118(A–2). By consolidating the database operations into a single transaction, the conversion participant may generate a set of CLI commands that relate to both the interface and VLAN configuration updates.

At operation 100(E), the N conversion participants determine N sets of CLI commands. Each conversion participant may: (i) determine a database transaction based on the configuration updates associated with the subsystems assigned to the participant, (ii) determine a set of CLI commands based on the determined database transaction, and (iii) discard the database transaction without committing the database transaction. A database transaction may be a sequence of database operations that are treated as a single unit. By determining the CLI commands based on a database transaction and then discarding the transaction without committing it, a conversion participant may generate CLI commands that accurately reflect the configuration updates specified by the YANG modules assigned to the participant, without modifying the existing configuration state of the network device 106.

For example, conversion participant A 118(A) may be assigned YANG modules that specify configuration updates related to interface settings. In this example, conversion participant A 118(A) may determine a database transaction that includes operations for updating the interface configuration tables in configuration database A 120(A) based on the assigned YANG modules. Conversion participant A 118(A) may then determine, based on the database transaction, the corresponding CLI commands required to implement the interface configuration updates on the network device 106. However, instead of committing the database transaction and applying the updates to configuration database A 120(A), conversion participant A 118(A) discards the transaction to ensure that the existing configuration state of the network device 106 remains unchanged.

Similarly, conversion participant N 118(N) may be assigned YANG modules that specify configuration updates related to routing protocols. In this example, conversion participant N 118(N) may determine a database transaction that includes operations for updating the routing protocol configuration tables in configuration database N 120(N) based on the assigned YANG modules. Conversion participant N 118(N) may then determine, based on the database transaction, the corresponding CLI commands required to implement the routing protocol configuration updates on the network device 106. However, instead of committing the database transaction and applying the updates to configuration database B 120(B), conversion participant A 118(B)

discards the transaction to ensure that the existing configuration state of the network device 106 remains unchanged.

At operation 100(F), the orchestrator component 116 generates and transmits an RPC response. The orchestrator component 116 may generate the RPC response by: (i) combining the N CLI command sets generated by the N conversion participants and (ii) including the combined commands as the payload of an RPC response (e.g., a NETCONF RPC response). In some implementations, after all the conversion participants have generated their respective sets of CLI commands, the network controller 104 may aggregate these sets to produce a comprehensive CLI representation of the requested configuration updates. After the orchestrator component 116 generates the RPC response, the orchestrator component 116 provides the RPC response to the network controller 104. The network controller 104 may then present the aggregated CLI representation to the network administrator 102 for review and/or confirmation. The network administrator 102 may then examine the CLI commands to determine whether they align with their intended configuration updates. If the network administrator 102 approves the CLI representation, the network controller 104 may proceed to apply the configuration updates to the network device 106 (e.g., by executing the CLI commands on the network device 106.

At operation 100(G), the network controller 104 stores the CLI representation on the database 108. The database 108 may be used as a log database and/or to provide a record of network device configuration changes. In some implementations, the database 108 may be used to determine whether a requested CLI template conflicts with the existing network device configuration as provisioned by the network controller 104 and using a YANG payload.

Figure 2:
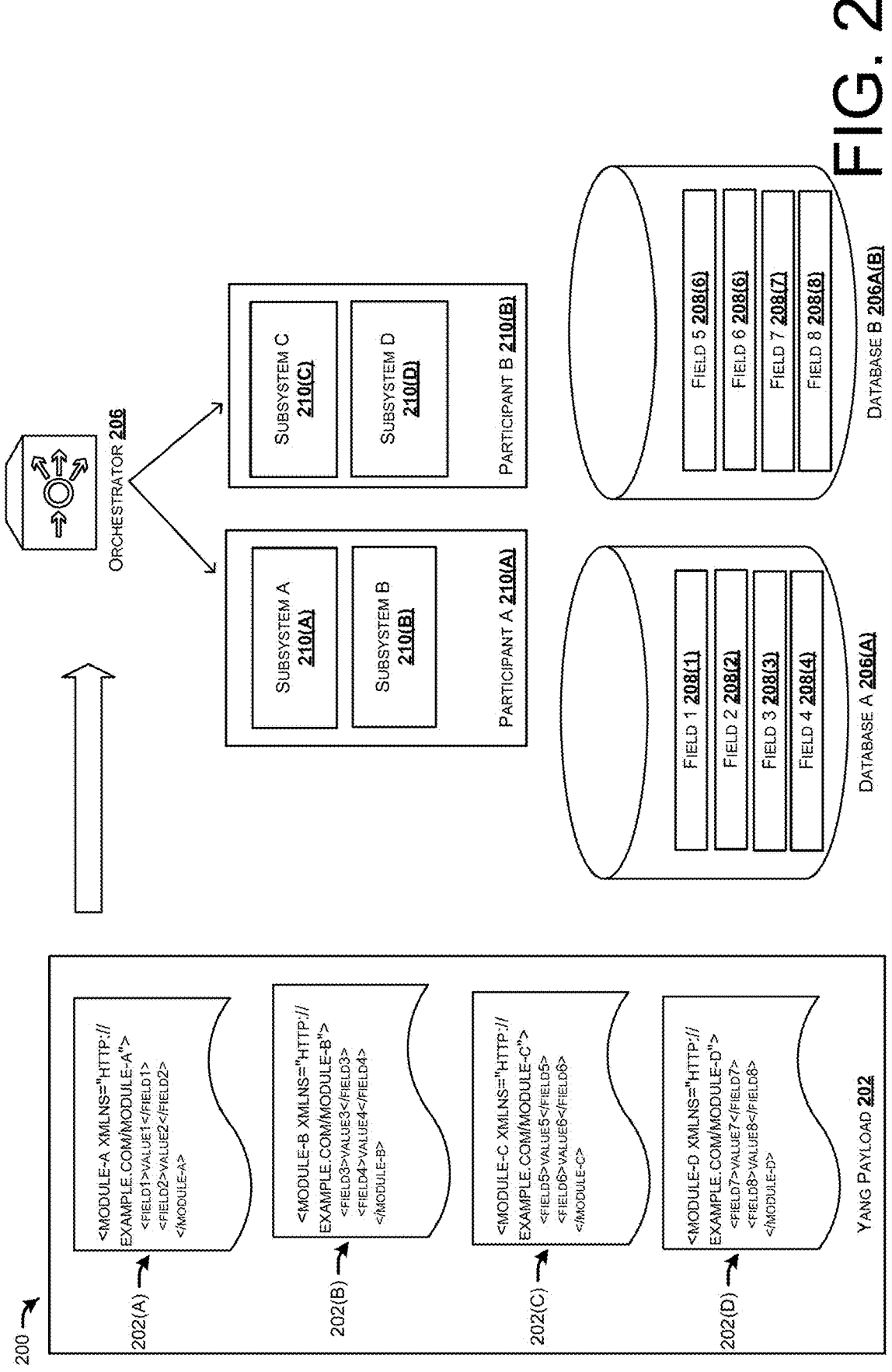
FIG. 2 provides an operational example of determining conversion participants based on a set of YANG modules.

FIG. 2 provides an operational example 200 of determining conversion participants based on a set of YANG modules. As depicted in FIG. 2, a YANG payload 202 (e.g., the YANG payload of an NETCONF input) may include four YANG modules: YANG module A 202(A), which updates two fields Field1 208(1) and Field2 208(2); YANG module B 202(B), which updates two fields Field3 208(3) and Field4 208(4); YANG module C 202(C), which updates two fields Field5 208(5) and Field6 208(6); and YANG module D 202(D), which updates two fields Field7 208(7) and Field8 208(8). The orchestrator component 206 may receive the YANG payload 202 from a network controller.

As further depicted in FIG. 2, an orchestrator component 206 assigns the YANG payload 202 to two conversion participants based on the schemas of two configuration databases. Specifically, the orchestrator component 206 has assigned the YANG module A 202(A), which is associated with fields Field1 208(1) and Field2 208(2), and YANG module B 202(B), which is associated with fields Field3 208(3) and Field4 208(4), to participant A 210(A). The reason for this assignment is that Field1 208(1), Field2 208(2), Field3 208(3), and Field4 208(4) are associated with the schema of database A 206(A), and that database A 206(A) is associated with participant A 210(A). In some implementations, participant A 210(A) is configured to determine a database transaction against database A 206(A) based on the YANG module A 202(A) and the YANG module B 202(B), determine CLI commands based on the database transaction, and then discard the database transaction without committing it.

Furthermore, the orchestrator component 206 has assigned the YANG module C 202(C), which is associated with fields Field5 208(5) and Field6 208(6), and YANG module D 202(D), which is associated with fields Field7

208(7) and Field8 208(8), to participant B 210(B). The reason for this assignment is that Field5 208(5), Field6 208(6), Field7 208(7), and Field8 208(8) are associated with the schema of database B 206(B), and that database B 206(B) is associated with participant B 210(B). In some implementations, participant B 210(B) is configured to determine a database transaction against database B 206(B based on the YANG module C 202(C) and the YANG module D 202(D), determine CLI commands based on the database transaction, and then discard the database transaction without committing it. After the two participants determine their respective CLI command sets, the orchestrator component 206 may combine these sets and provide the combined CLI representation to a network controller.

Figure 3:
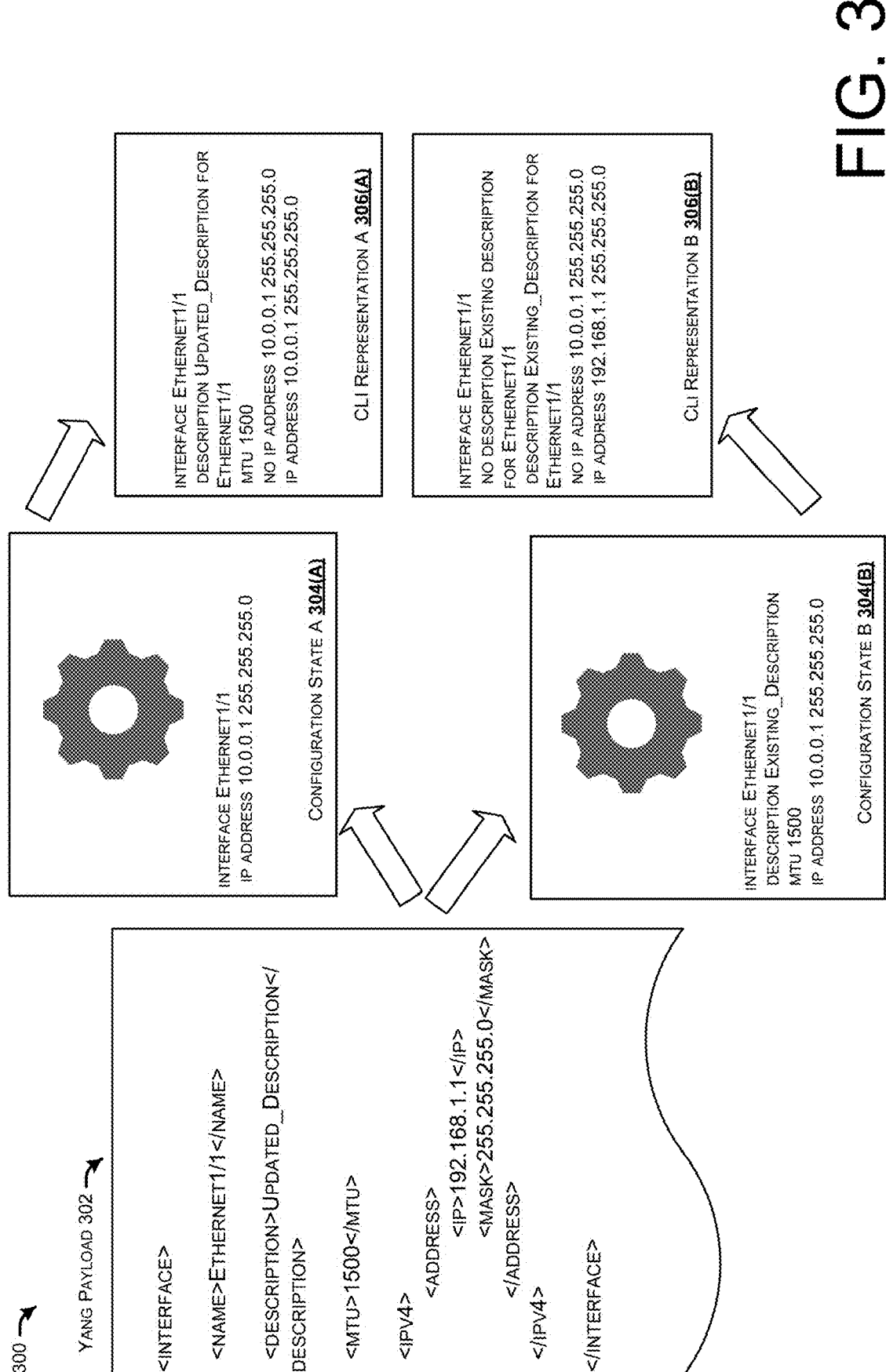
FIG. 3 provides an operational example of stateful conversions of a YANG payload into command line interface (CLI) commands based on different device configuration states.

FIG. 3 provides an operational example 300 of stateful conversions of a YANG payload 302 into CLI commands based on different device configuration states. Specifically, as depicted in FIG. 3, the CLI representation A 306(A) is the result of converting the YANG payload 302 to CLI commands based on the device configuration state A 304(A), while the CLI representation B 306(B) is the result of converting the YANG payload 302 to CLI commands based on the device configuration state B 304(B).

As depicted in FIG. 3, the YANG payload 302 seeks to: (i) set the description of an interface Ethernet1/1 to "Updated_Description"), (ii) set the maximum transmission unit (MTU) size of the interface to 1500, and (iii) set the IP version 4 (IPv4) address of the interface to 192.168.1.1 255.255.255.0. This YANG payload 302 has only one conflict with the configuration state A 304(A): that the YANG payload 302 sets the IPV4 address of the interface to 192.168.1.1 255.255.255.0, while the existing configured IP address of the interface under the configuration state A 304(A) is 10.0.0.1 255.255.255.0. Given this, the CLI representation A 306(A) only needs to remove one existing field of the configuration state A 304(A) with the command "no ip address 10.0.0.1 255.255.255.0."

However, the YANG payload 302 has two conflicts with the configuration state B 304(B): (i) that the YANG payload 302 sets the IPv4 address of the interface to 192.168.1.1 255.255.255.0, while the existing configured IP address of the interface under the configuration state B 304(B) is 10.0.0.1 255.255.255.0, and (ii) that the YANG payload 302 sets the interface description of "Updated_Description," while the existing description of the interface under the configuration state B 304(B) is "Existing_Description." Given this, the CLI representation B 306(B) needs to remove the IP address field of configuration state B 304(B) with the command "no ip address 10.0.0.1 255.255.255.0" and the description field of configuration state B 304(B) with the command "no description Existing_Description for Ethernet1/1."

Additionally, while the configuration state A 304(A) does not have any MTU size configurations, configuration state B 304(B) specifies the MTU size of 1500, which is the same as the MTU size specified in the YANG payload 302. Accordingly, while CLI representation A 306(A) includes the command "MTU 1500" to set the MTU size parameter to 1500, CLI representation B 306(B) does not have any commands related to MTU size as no update of the MTU size is needed.

Figure 4:
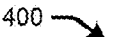
FIG. 4 is a flowchart diagram of an example process for converting first configuration data including a YANG data structure into second configuration data including CLI commands.

FIG. 4 is a flowchart diagram of an example process 400 for converting first configuration data including a YANG data structure into second configuration data including one or more CLI commands. The process 400 may be performed by an orchestrator component, such as the orchestrator component 116 of FIG. 1 and/or the orchestrator component 206 of FIG. 2.

At operation 402, an example system receives first configuration data. The first configuration data may include a YANG data structure and/or another data model representation identifying requested configuration setting for a network device.

After operation 402, the system determines M modules in the first configuration data. For example, the system determines a module A at operation 404A, a module B at operation 404B, a module K at operation 404K, and a module M at operation 404M.

In some implementations, the system may determine M YANG modules. However, while various implementations of the techniques disclosed herein describe assigning YANG modules and/or groups of YANG modules to conversion participants, a person of ordinary skill in the relevant technology will recognize that other (e.g., more granular) segments of a YANG data structure and/or another data model representation may be assigned to conversion participants. For example, a YANG module may include a container that includes configurations associated with an individual network component (e.g., an individual interface). In some implementations, the system may assign containers and/or groups of containers to conversion participants. As another example, a non-YANG data model representation may include a top-level hierarchical segment. The system may assign top-level hierarchical segments and/or groups of top-level hierarchical segments to conversion participants.

The system then determines N conversion participants each being assigned a subset of the M modules. For example, at operation 406A, a module subset including the module A and the module B has been assigned to a participant A. Additionally, at operation 406N, a module subset including the module K and the module M has been assigned to participant N. In some implementations, the modules affecting the same database and/or data store may be assigned to a common conversion participant.

At operation 408, the system determines second configuration data based on the output of the N conversion participants. The second configuration data may include one or more CLI commands.

In some implementations, each of the N conversion participants may: (i) determine a database transaction based on the configuration updates associated with the modules assigned to the participant, (ii) determine a set of CLI commands based on the determined database transaction, and (iii) discard the database transaction without committing the database transaction. The system may then determine the second configuration data by aggregating the N sets of CLI commands generated by the N conversion participants.

At operation 410, the system provides the second configuration data to a user (e.g., a network administrator). Providing (e.g., displaying) the second configuration data may enable the user to confirm that the requested configuration updates align with the user's intent before committing the updates to the network device. Providing the second configuration data may be in response to a "CLI preview" request (e.g., a command line preview request) by the user.

Figure 5:
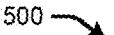
FIG. 5 is a flowchart diagram of an example process for configuration data conversion.
Figure 5:
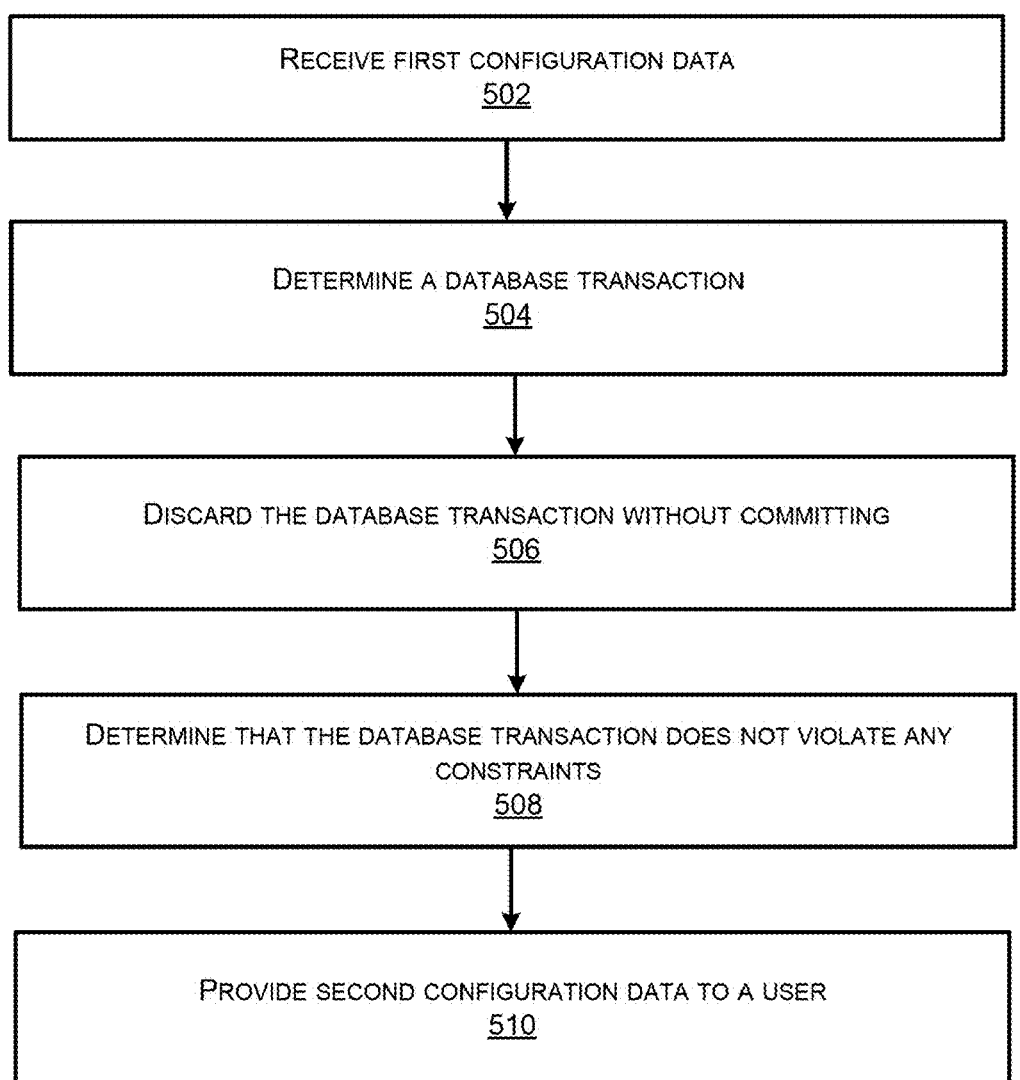

FIG. 5 is a flowchart diagram of an example process 500 for configuration data conversion. The process 500 may be performed by an orchestrator component, such as the orchestrator component 116 of FIG. 1 and/or the orchestrator component 206 of FIG. 2.

At operation 502, an example system receives first configuration data. The first configuration data may include a YANG data structure and/or another data model representation identifying requested configuration setting for a network device.

At operation 504, the system determines a database transaction based on the first configuration data. To determine the database transaction, the system may identify the YANG modules included in the YANG data structure and assign each YANG module to a corresponding conversion participant based on the configuration database associated with the module. Each conversion participant may then determine a portion of the database transaction based on the YANG modules assigned to it.

For example, if the YANG data structure includes YANG modules related to interface settings and VLAN configurations, the system may assign the interface-related YANG modules to a conversion participant associated with an interface configuration database and the VLAN-related YANG modules to a conversion participant associated with a VLAN configuration database. Each conversion participant may then determine its portion of the database transaction by generating database operations to update the respective configuration tables based on the assigned YANG modules.

At operation 506, the system discards the database transaction without committing the transaction to the configuration databases. By discarding the database transaction, the system may ensure that the configuration state of the network device remains unchanged during the YANG-to-CLI conversion process. This may enable the system to generate accurate CLI commands based on the current configuration state of the network device, without modifying the live configuration.

At operation 508, the system determines that the database transaction satisfies a set of constraints. For example, the system may determine whether the database transaction overrides an existing network configuration. As another example, the system may determine whether the database transaction violates any configuration validation rules and/or policies defined for the network device. These validation rules and/or policies may include constraints on parameter values, dependencies between configuration elements, and/or the like.

At operation 510, the system determines second configuration data based on the database transaction and provides the second configuration data to a user (e.g., a network administrator). The second configuration data may include a set of CLI commands corresponding to the configuration updates specified by the YANG data structure. To determine the second configuration data, each conversion participant may analyze its portion of the database transaction and generate the corresponding CLI commands required to implement the configuration updates on the network device.

For example, the conversion participant associated with the interface configuration database may analyze the database operations related to updating the interface configuration tables and generate CLI commands to modify the interface settings accordingly. Similarly, the conversion participant associated with the VLAN configuration database may analyze the database operations related to updating the VLAN configuration tables and generate CLI commands to modify the VLAN configurations.

In some implementations, the system outputs the second configuration data. This may involve aggregating the CLI commands generated by each conversion participant to produce a comprehensive set of CLI commands representing the requested configuration updates. The aggregated CLI commands may then be presented to a network administrator for review and/or confirmation.

Figure 6:
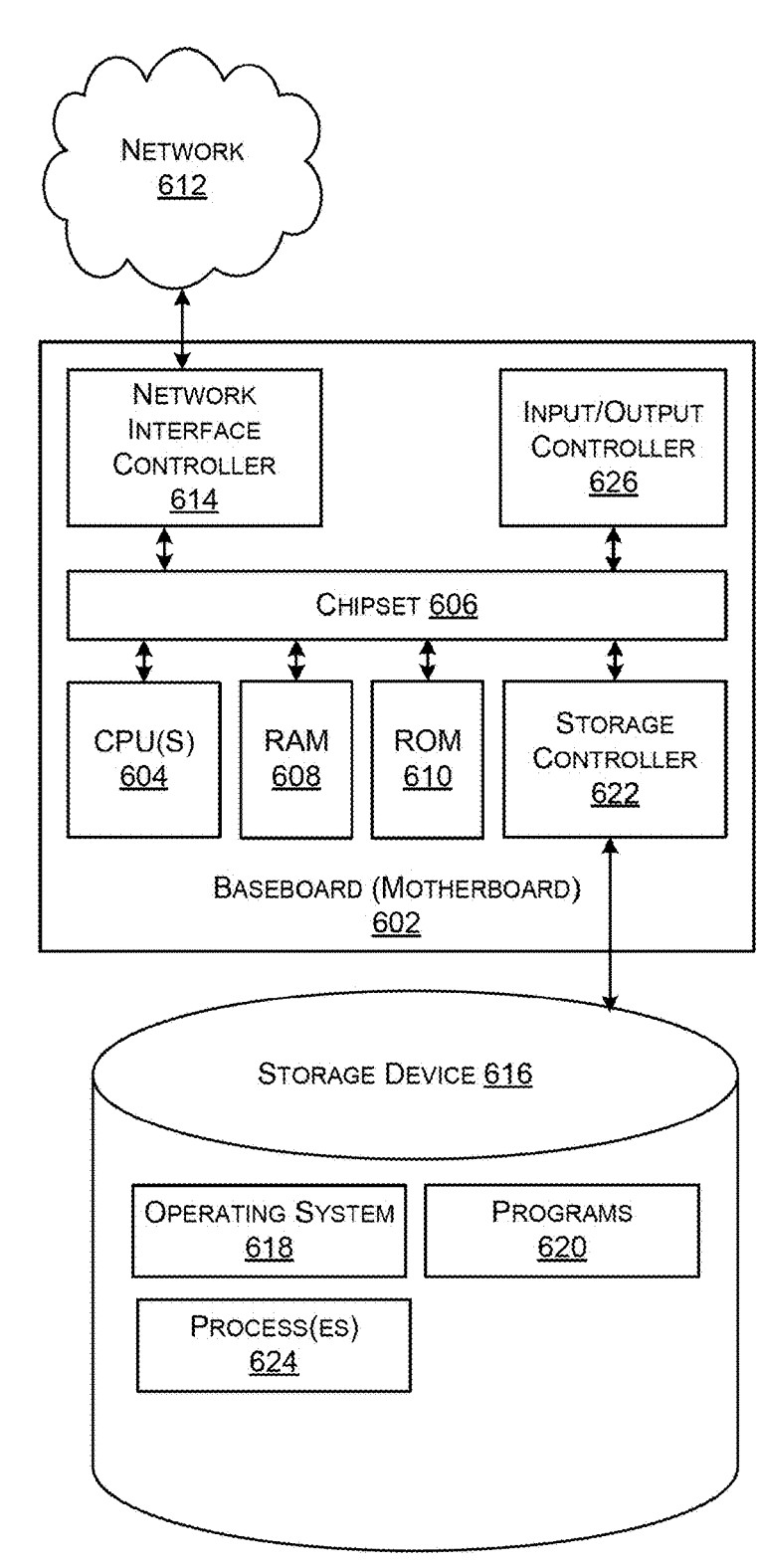
FIG. 6 shows an example computer architecture for a server computer capable of executing program components for implementing the functionality described above.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may, in some examples, correspond to a network node (e.g., the 6) described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to start up the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 612. The chipset 606 can include functionality for providing network connectivity through a network interface controller (NIC) 614, such as a gigabit Ethernet adapter. The NIC 614 is capable of connecting the computer 600 to other computing devices over the network 612. It should be appreciated that multiple NICs 614 can be present in the computer 600, connecting the computer 600 to other types of networks and remote computer systems. In some instances, the NICs 614 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. The storage device 616 can be connected to the computer 600 through a storage controller 622 connected to the chipset 606. The storage device 616 can consist of one or more physical storage units. A storage controller can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 616 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 616 is characterized as primary or secondary storage, and the like.

For example, the computer 600 can store information to the storage device 616 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 616 by detecting the physical states or characteristics of one or more particular locations within the physical storage units.

In addition to the mass storage device 616 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computers 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 616 can store an operating system 618 utilized to control the operation of the computer 600. According to one embodiment, the operating system comprises the LINUX™ operating system. According to another embodiment, the operating system includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 616 can store other system or application programs and data utilized by the computer 600.

In one embodiment, the storage device 616 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-6. The computer 600 can also include computer-readable storage media having instructions stored thereupon for performing any of the other computer-implemented operations described herein.

As illustrated in FIG. 6, the storage device 616 stores programs 620, which may include one or more processes 624, as well as 6. The process(es) 624 may include instructions that, when executed by the CPU(s) 604, cause the computer 600 and/or the CPU(s) 604 to perform one or more operations.

The computer 600 can also include at least one input/output controller 626 for receiving and processing input from a number of input devices, such as a keyboard, a mouse, a touchpad, a touch screen, an electronic stylus, or other type of input device. Similarly, an input/output controller 626 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, by one or more processors, first configuration data associated with a network device, the first configuration data comprising a Yet Another Next Generation (YANG) payload;

determining, by the one or more processors, a first subset of the YANG payload that is associated with a first network configuration database;

determining, by the one or more processors, a first database transaction, wherein the first database transaction represents one or more database updates to the first network configuration database that is determined based on a first state of the network device and one or more configuration requirements represented by the first subset;

discarding, by the one or more processors, the first database transaction;

determining, by the one or more processors, second configuration data based on the first database transaction, the second configuration data comprising a command line representation of the YANG payload; and providing, by the one or more processors, the second configuration data to a system, the system configured to display the command line representation to a user.

2. The method of claim 1, wherein determining the first subset comprises:

determining a first module and a second module of the YANG payload, the first module associated with one or more first configuration features and the second module associated with one or more second configuration features; and based on determining that the one or more first configuration features and the one or more second configuration features are associated with the first network configuration database, determining the first subset based on the first module and the second module.

3. The method of claim 1, wherein determining second configuration data comprises:

determining a second subset of the YANG payload that is associated with a second network configuration database;

determining a second database transaction, wherein the second database transaction represents one or more second database updates to the second network configuration database that is determined based on the first state of the network device and one or more second configuration requirements represented by the second subset;

discarding the second database transaction; and determining the command line representation based on the first database transaction and the second database transaction.

4. The method of claim 1, wherein:

the first configuration data comprises a first Network Configuration Protocol (NETCONF) remote call procedure (RPC) and the second configuration data comprises a second NETCONF RPC.

5. The method of claim 1, wherein:

receiving the first configuration data comprises receiving the first configuration data from the system; and the system is configured to:

receive one or more configuration update requests from the user;

receive a command line preview request;

determine, based on the one or more configuration update requests, a user intent; and determine the YANG payload based on the user intent.

6. The method of claim 1, wherein the first configuration data is in an input associated with at least one of:

a Network Configuration Protocol(NETCONF), or a Representation State Transfer Configuration Protocol (RESTCONF).

7. The method of claim 1, wherein the one or more processors comprises at least one of:

a first processor executing on the network device, a second processor executing on a controller device associated with a network comprising the network device, or a third processor executing on the system.

8. The method of claim 1, wherein the one or more processors comprise:

a first processor executing on a first device, the first processor configured to determine the first subset and determine the second configuration data; and a second processor executing on a second device, the second processor configured to determine the first database transaction, discard the first database transaction, and provide an indication of the first database transaction to the first processor.

9. The method of claim 1, further comprising:

receiving, by the one or more processors and from the system, a request to commit the first configuration data to the network device; and based at least in part on receiving the request, committing, by the one or more processors, the first database transaction to the first network configuration database.

10. The method of claim 1, further comprising:

determining, by the one or more processors, that the YANG payload violates an existing configuration of the network device; and based on determining that the YANG payload violates the existing configuration, determining that the YANG payload is anomalous.

11. The method of claim 1, wherein determining the second configuration data comprises:

determining that the first database transaction satisfies one or more constraints.

12. A system comprising:

one or more processors; and one or more computer-readable media storing computer-executable instructions that, when executed by the one or more processors, cause the one or more processors to perform operations comprising:

receiving first configuration data associated with a network device, the first configuration data comprising a Yet Another Next Generation (YANG) payload;

determining a first subset of the YANG payload that is associated with a first network configuration database;

determining a first database transaction, wherein the first database transaction represents one or more database updates to the first network configuration database that is determined based on a first state of the network device and one or more configuration requirements represented by the first subset;

discarding the first database transaction;

determining second configuration data based on the first database transaction, the second configuration data comprising a command line representation of the YANG payload; and providing the second configuration data to a system, the system configured to display the command line representation to a user.

13. The system of claim 12, wherein determining the first subset comprises:

determining, by the one or more processors, a first module and a second module of the YANG payload, the first module associated with one or more first configuration features and the second module associated with one or more second configuration features; and based on determining that the one or more first configuration features and the one or more second configuration features are associated with the first network configuration database, determining the first subset based on the first module and the second module.

14. The system of claim 12, wherein determining second configuration data comprises:

determining a second subset of the YANG payload that is associated with a second network configuration database;

determining a second database transaction, wherein the second database transaction represents one or more second database updates to the second network configuration database that is determined based on the first state of the network device and one or more second configuration requirements represented by the second subset;

discarding the second database transaction; and determining the command line representation based on the first database transaction and the second database transaction.

15. The system of claim 12, wherein:

the first configuration data comprises a first Network Configuration Protocol (NETCONF) remote call procedure (RPC) and the second configuration data comprises a second NETCONF RPC.

16. One or more non-transitory computer-readable media storing computer-executable instructions that, when executed by one or more processors, cause the one or more processors to perform operations comprising:

receiving first configuration data associated with a network device, the first configuration data comprising a Yet Another Next Generation (YANG) payload;

determining a first subset of the YANG payload that is associated with a first network configuration database;

determining a first database transaction, wherein the first database transaction represents one or more database updates to the first network configuration database that is determined based on a first state of the network device and one or more configuration requirements represented by the first subset;

discarding the first database transaction;

determining second configuration data based on the first database transaction, the second configuration data comprising a command line representation of the YANG payload; and providing the second configuration data to a system, the system configured to display the command line representation to a user.

17. The one or more non-transitory computer-readable media of claim 16, wherein determining the first subset comprises:

determining, by the one or more processors, a first module and a second module of the YANG payload, the first module associated with one or more first configuration features and the second module associated with one or more second configuration features; and based on determining that the one or more first configuration features and the one or more second configuration features are associated with the first network configuration database, determining the first subset based on the first module and the second module.

18. The one or more non-transitory computer-readable media of claim 16, wherein determining second configuration data comprises:

determining a second subset of the YANG payload that is associated with a second network configuration database;

determining a second database transaction, wherein the second database transaction represents one or more second database updates to the second network configuration database that is determined based on the first state of the network device and one or more second configuration requirements represented by the second subset;

discarding the second database transaction; and determining the command line representation based on the first database transaction and the second database transaction.

19. The one or more non-transitory computer-readable media of claim 16, wherein:

the first configuration data comprises a first Network Configuration Protocol (NETCONF) remote call procedure (RPC) and the second configuration data comprises a second NETCONF RPC.

20. The one or more non-transitory computer-readable media of claim 16, wherein:

receiving the first configuration data comprises receiving the first configuration data from the system; and the system is configured to:

receive one or more configuration update requests from the user;

receive a command line preview request;

determine, based on the one or more configuration update requests, a user intent; and determine the YANG payload based on the user intent.

* * * * *